& Cie, Paris, France

United States Patent [19]
Hespel

[11] 3,902,919
[45] Sept. 2, 1975

[54] ELECTROCHEMICAL CELL SUITABLE FOR OPERATING IN ALL POSITIONS

[75] Inventor: Claude Hespel, Limours, France

[73] Assignee: Societe Generale de Constructions Electriques et Mecaniques Alsthom & Cie, Paris, France

[22] Filed: Oct. 25, 1974

[21] Appl. No.: 518,121

[30] Foreign Application Priority Data
Nov. 14, 1973 France .............................. 73.40436

[52] U.S. Cl. ............................................. 136/86 R
[51] Int. Cl. ........................................... H01m 27/00
[58] Field of Search ................................. 136/86 R

*Primary Examiner*—John H. Mack
*Assistant Examiner*—H. A. Feeley
*Attorney, Agent, or Firm*—Sughrue, Rothwell, Mion, Zinn & Macpeak

[57] ABSTRACT

A fuel cell for land vehicles, space craft and submarines is arranged in the center of a circular shell and supplied with hydrazine, hydrogen peroxide and potassium hydroxide by two outside tanks. The residual gases and a fraction of the potassium hydroxide coming from the cell are conveyed into the vicinity of the geometrical center of two auxiliary compartments of potassium hydroxide arranged inside the shell, these compartments comprising, also, tubes for discharging the gases and electrolyte, external of the shell, whose upstream inlet opens into the vicinity of the geometrical center, so that the volume of electrolyte in these compartments remain substantially constant, whatever the position of the cell may be.

9 Claims, 1 Drawing Figure

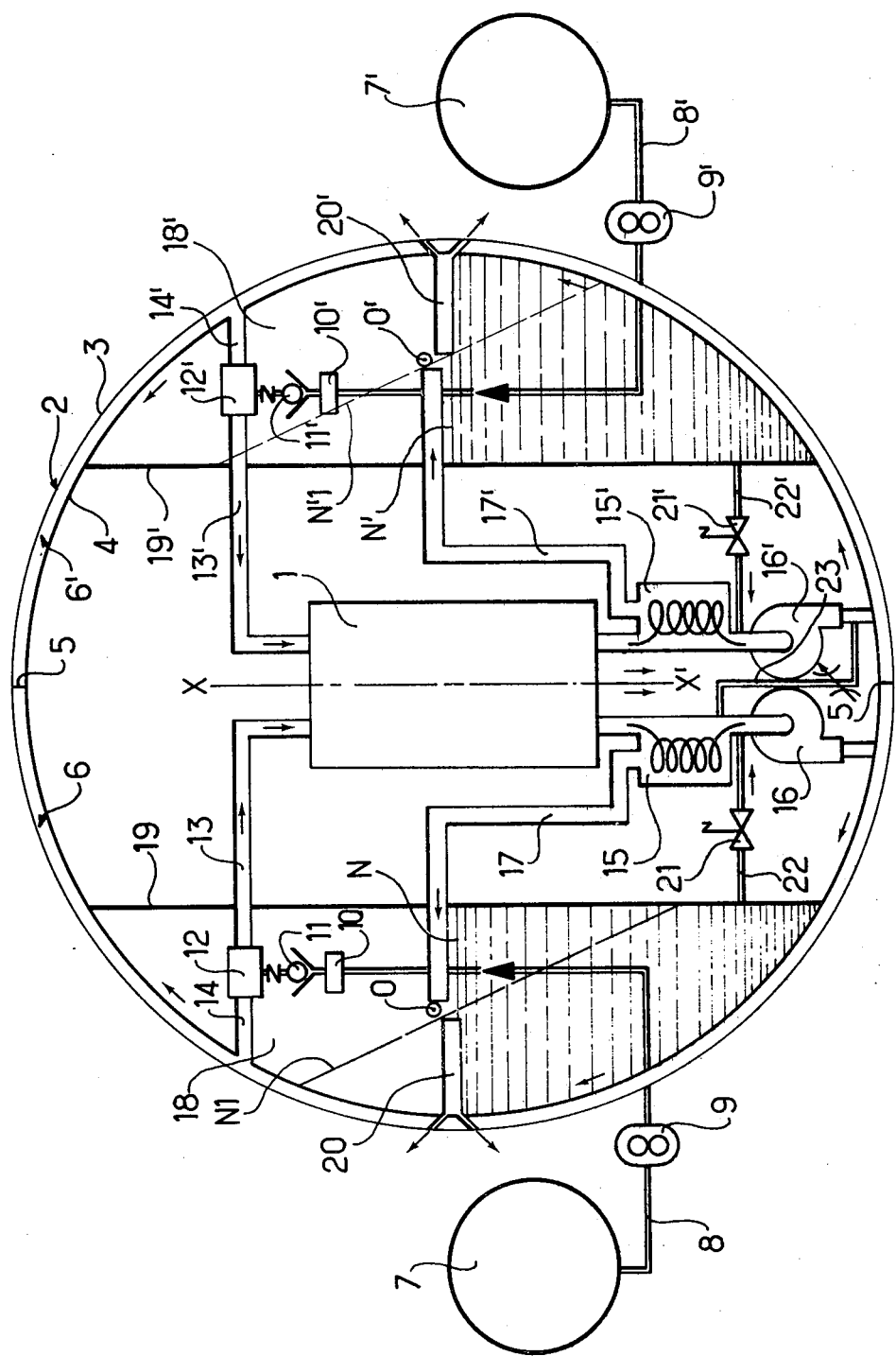

3,902,919

ELECTROCHEMICAL CELL SUITABLE FOR OPERATING IN ALL POSITIONS

BACKGROUND OF THE INVENTION

1. Field of the Invention

The present invention concerns an electrochemical cell and more particularly an electrochemical cell of the fuel cell type which may operate in any position.

2. Description of the Prior Art

Electrochemical cells of the fuel cell type are well-known. It is known that in fuel cells, a fuel or reductant and a combustive or oxidant, whose interaction in an electrolyte creates at the level of the appropriate electrodes an electromotive force.

In such cells, it is therefore necessary on the one hand to bring the reagents as well as the electrolytes to the level of the electrodes and, on the other hand, to remove, after the reaction, the electrolyte as well as the products resulting from the reaction process.

Circumstances therefore lead to the combining, with the electrochemical cell itself, devices and elements such as pumps, cocks, valves, tanks and also, in certain cases vortex separators or the like, the object of these latter being, more particularly, to effect the mutual separation of the various products resulting from the reaction.

The implementing of such devices and elements does not normally create any particular problem in the case where they are combined with a fixed cell, on the other hand, in the case where the position of the cell varies with great amplitude and in a random way, serious difficulties appear which result more particularly from the unpriming of the pumps, the fluctuation of the levels in the tanks, the removal of reaction products. This may cause the pure and simple stoppage of the cell.

The present invention makes it possible to overcome such a disadvantage and it has for its objects an electrochemical cell capable of operating in any position and whose operation is not disturbed when the vertical position varies suddenly with great amplitude.

SUMMARY OF THE INVENTION

A body which is preferably cylindrical is formed by two concentric walls of cylindrical form defining between them a space separated into two parts forming compartments or sections having substantially equal volumes by means of two diametrically opposite partitions defining an axis of symmetry separating the cell into two reaction parts, a first part assigned to the fuel fluid and a second part assigned to the combustive fluid. A reaction enclosure or fuel cell is arranged substantially at the center of the body. The two reaction parts each comprise a tank for supplying fluid and electrolyte, an injector suitable for supplying the reaction enclosure with fluid as well as with electrolyte with the injector being in communication with the tank on the one hand, as well as with one of the compartments on the other hand. A decanter or vortex separator is arranged at the outlet of the reaction enclosure suitable for separating the electrolyte and the gases coming from the said enclosure into two fractions, a first fraction which is liquid and a second fraction comprising the gases as well as liquid in the form of emulsion. A pump conveys the first liquid fraction towards an associated section. A duct discharges the second fraction external to the body. The cell is characterized in that the duct for the discharging of the second fraction leads into the vicinity of the geometrical center of an auxiliary tank defined by the internal wall of the body on the one hand and a partition which is substantially parallel to the axis of symmetry on the other hand. A tube or duct discharges electrolyte and gas outside the body and is provided within the auxiliary tank, the inlet to the tube also being arranged in the vicinity of the geometrical center, so that the volume of the liquid in the auxiliary tank or compartment remains substantially constant, with the level of the liquid passing always substantially in the vicinity of the geometrical center whatever the position of the cell may be.

BRIEF DESCRIPTION OF THE DRAWING

Other characteristics and advantages of the invention become apparent from the following description given by way of a purely illustrative example having no limiting character, with reference to the single accompanying drawing showing a cutaway view of a preferred embodiment of the invention.

DESCRIPTION OF THE PREFERRED EMBODIMENT

According to the accompanying FIGURE, a cell assembly of the fuel cell type according to the invention has an axis of symmetry XX'. It comprises a reaction enclosure or fuel, that is, the fuel cell itself 1, arranged substantially in the center of a cylindrical body or shell 2 formed by two spaced walls 3 and 4. The shell 2 is intended to fulfill the function of a heat exchanger. Two partitions 5 which are diametrically opposite divide such an exchanger into two sections or compartments 6 and 6' having equal volumes.

In the first instance, the section 6 is assigned to the fuel or reductant and shown, in the FIGURE, to the left of the axis XX' will be described, it being understood that the section part 6' assigned to the combustive or oxidant, hence the right-hand part of the FIGURE, comprises similar elements in equal numbers.

The section assigned to the combustive, for example hydrazine, therefore comprises a tank 7 for the fuel and for electrolyte, in this case, a concentrated potassium hydroxide solution, from which a duct 8 which cooperates with a volumetric pump 9 leads out for conveying such a fluid successively towards a filter 10, a non-return valve 11 and an injector 12.

That element 12 therefore injects hydrazine and potassium hydroxide into the cell 1 by means of a duct 13 and on the other hand, it is also supplied by a duct 14 communicating with the hollow section 6 of the cylindrical shell 2.

The products coming out from the cell on the fuel side, in this case potassium hydroxide and gases in the form of an emulsion, are directed towards a decanter or separator 15 of the "Vortex" type.

The major part of the potassium hydroxide free from gas is then conveyed by means of the pump 16 into the hollow section 6 of the shell 2, whereas the residual fraction of potassium hydroxide, as well as the gases in the form of an emulsion pass through the duct 17 to come out in the vicinity of the geometrical center O of an auxiliary tank 18 defined by the wall 4 of the shell 2 and a partition 19. A tube or duct 20 whose upstream orifice or inlet opens into the vicinity of the center O insuring the removal of the gases as well as of the electrolyte outwards, this being accomplished through the section 6 by passages extending through the shell.

Moreover, an electrovalve 21 arranged on a duct 22 insures the possible putting into communication of the tank 18 with the input of the pump 16.

As has been specified hereinabove, the part of the cell assigned to the combustive, in this case hydrogen peroxide, comprises identical elements, namely, mainly the tank 7′, the volumetric pump 9′, the injector 12′, the decanter 15′, the pump 16′, the auxiliary tank 18′ having as its center O′, the tube 20′ and the electrovalve 21′, the ducts and other auxiliary elements being referenced by the same reference numeral as in the case of the hydrazine circuit, but having the "prime" index assigned to them.

Nevertheless, a tubing 23 serves for putting the outlet of the decanter 15 in communication with the discharge side of the pump 16′, with a view to balancing the potassium hydroxide contents of the anode and cathode electrolytes of the cell 1.

Such a device operates substantially as follows. It being supposed that the cell as a whole is originally in the horizontal position and that the auxiliary tanks 18, 18′ are filled with electrolyte whose level is shown substantially and respectively by the straight lines N and N′, the starting up of the cell 1 is effected by the starting up of the pumps 9 and 9′ on the one hand and pumps 16 and 16′ on the other hand, the electrovalves 21 and 21′ being open.

Consequently, it will be seen that the electrolyte coming from the auxiliary compartment 18 passes along the duct 22, then is conveyed by the pump 16 inside the section 6 of the shell 2 so as to reach subsequently the injector 12 and the cell 1 through the duct 13, whereas the hydrazine coming from the tank 7 is conveyed towards the injector 12 through the duct 8.

Likewise, the electrolyte coming from the auxiliary compartment 18′ passes along the duct 22′, then is conveyed by the pump 16′ inside the section 6′ of the shell 2 to reach, subsequently, the injector 12′ and the cell 1 by means of the duct 13′, whereas the hydrogen peroxide coming from the tank 7′ is conveyed towards the injector 12′ by means of the duct 8′.

When the cell 1 discharges according to its rated electrical characteristics, hence when the filling of the loops described above has been effected, the electrovalves 21 and 21′ close.

At that moment, the electrolyte and residual gases reaching the decanters or separators 15 and 15′ are divided on the one hand into a liquid part conveyed by the pumps 16 and 16′ respectively into the loops described hereinabove and on the other hand, into an emulsion part and into a gas poured out in the vicinity of the centers O and O′ of the auxiliary compartments 18 and 18′ respectively.

The tubes 20 and 20′ insure the outward discharge of the residual gases as well as of the electrolyte, so that the levels N and N′ in the auxiliary compartments 18 and 18′ remain substantially constant.

It should be observed, moreover, that during the conveying in the parts 6 and 6′ of the shell 2, the liquids give off their calories to the outside medium, with the compartments 6 and 6′ acting as heat exchangers.

If it is supposed now that the cell assumes a large angle of list such that the levels N and N′ take up respectively the positions N1 and N′1, it will be seen that the removal of the gases and of the electrolyte is still insured by means of the tubes 20 and 20′.

Such a characteristic is valid even if the cell effects a rotation of 180° and more and also for any angle of pitch.

In other words, the levels N and N′ always pass in the vicinity of the points or geometric centers O and O′ so that the upstream ends of the tubes 20 and 20′ are permanently above the level and insure, thus, effect continuous removal of the potassium hydroxide and of the gases.

The cell according to the invention may therefore be used in any device which is liable to take up, at any moment, any position. Applications which are a particular advantage may therefore be found for it in land vehicles, submarines and space craft.

Although the device which has just been described may appear to afford the greatest advantages for implementing the invention in a particular technical situation, it will be understood that various modifications may be made thereto without going beyond the scope of the invention, it being possible to replace certain of its elements by others which are capable of fulfilling the same technical function therein.

What is claimed is:

1. In combination; an electrochemical fuel cell assembly operating in all positions, comprising: a body formed by two concentric walls defining therebetween a space separated into two sections having substantially equal volumes by means of two diametrically opposite partitions defining an axis of symmetry including a first section assigned to the reductant and a second section assigned to the oxidant; a fuel cell arranged substantially at the center of said body, comprising: a first tank for supplying reductant and electrolyte; a second tank for supplying oxidant, an injector connected to each tank for supplying the cell with reactants as well as electrolyte, said injectors being in communication with respective tanks and said sections; separators coupled to the outlets of said fuel cell for separating the electrolyte and the gases coming from said fuel cell into two fractions, a first fraction which is liquid and a second fraction comprising gases; pumps downstream of said separators connected to said separators for conveying said first liquid fraction to respective sections; second partitions on each side of said fuel cell separating the inner concentric wall into three compartments, said center compartment containing said fuel cell, said partitions being substantially parallel to the axis of symmetry of the body, ducts connected to said separators for discharging said second fractions into the compartments to each side of the central compartment containing the fuel cell, said ducts for discharging said second fractions leading into the vicinity of the geometrical center of respective compartments defined by the concentric wall of the body and said second partitions, and second ducts for the discharge of electrolyte and of gas to the outside of said body coupled to respective compartments, the inlets of the second ducts being arranged in the vicinity of said goemetrical center, so that the volume of the liquid in said compartments to each side of said center compartment remains substantially constant and the level of said liquid remains substantially in the vicinity of said geometrical center whater position the body may take.

2. The cell according to claim 1, further including an electrovalve for putting said respective compartments into communication with the output of said separators during start up and for interrupting said communication when the cell operates according to its rated characteristics.

3. The cell according to claim 1, wherein: pumps supply said injectors from said compartments through a filter and a non-return valve.

4. The cell according to claim 2, wherein: pumps supply said injectors from said compartments through a filter and a non-return valve.

5. The cell according to claim 1, further comprising: a tubing communicating the liquid fraction of the reductant with the liquid fraction oxidant for balancing the electrolyte concentration therebetween.

6. The cell according to claim 2, further comprising: a tubing communicating the liquid fraction of the reductant with the liquid fraction of the oxidant for balancing the electrolyte concentration therebetween.

7. The cell according to claim 3, further comprising: a tubing communicating the liquid fraction of the reductant with the liquid fraction of the oxidant for balancing the electrolyte concentration therebetween.

8. The cell according to claim 4, further comprising: a tubing communicating the liquid fraction of the reductant with the of the oxidant for balancing the electrolyte concentration therebetween.

9. The cell according to claim 1, wherein: said reductant comprises hydrazine, said oxidant comprises hydrogen peroxide, said electrolyte comprises a potassium hydroxide solution.

* * * * *